(12) United States Patent
Zhu (10) Patent No.: US 11,494,946 B2
(45) Date of Patent: Nov. 8, 2022

(54) DATA COMPRESSION DEVICE AND COMPRESSION METHOD CONFIGURED TO GRADUALLY ADJUST A QUANTIZATION STEP SIZE TO OBTAIN AN OPTIMAL TARGET QUANTIZATION STEP SIZE

(71) Applicant: TCL CHINA STAR OPTOELECTRONICS TECHNOLOGY CO., LTD., Guangdong (CN)

(72) Inventor: Jiang Zhu, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 211 days.

(21) Appl. No.: 16/618,911

(22) PCT Filed: Nov. 12, 2019

(86) PCT No.: PCT/CN2019/117688
§ 371 (c)(1),
(2) Date: Dec. 3, 2019

(87) PCT Pub. No.: WO2021/027144
PCT Pub. Date: Feb. 18, 2021

(65) Prior Publication Data
US 2021/0366157 A1    Nov. 25, 2021

(30) Foreign Application Priority Data

Aug. 12, 2019 (CN) .......................... 201910737895.X (51) Int. Cl.
*H04N 19/00* (2014.01)
*G06T 9/00* (2006.01)
(Continued)

(52) U.S. Cl.
CPC .................. *G06T 9/00* (2013.01); *G06T 3/40* (2013.01); *H04N 19/119* (2014.11);
(Continued)

(58) Field of Classification Search
CPC .... H04N 19/124; H04N 19/60; H04N 19/126; H04N 19/147; H04N 19/146; H04N 19/176; H04N 19/625; H04N 19/91
See application file for complete search history.

(56) References Cited

U.S. PATENT DOCUMENTS

| 5,724,453 A | * | 3/1998 | Ratnakar | ............... H04N 19/147 358/426.14 |
| 2003/0035589 A1 | * | 2/2003 | Kim | ........................ G06T 9/005 382/239 |

(Continued)

FOREIGN PATENT DOCUMENTS

| CN | 1937776 A | 3/2007 |
| CN | 1972445 A | 5/2007 |

(Continued)

OTHER PUBLICATIONS

Tuba, Eva, et al. "JPEG quantization table optimization by guided fireworks algorithm." International Workshop on Combinatorial Image Analysis. Springer, Cham, 2017.*

*Primary Examiner* — Li Liu
(74) *Attorney, Agent, or Firm* — PV IP PC; Wei Te Chung; Ude Lu (57) ABSTRACT

A data compression device and a compression method are provided. The data compression device includes a quantization table processing unit and a quantization unit. The quantization table processing unit determines a target quantization table in which a quantization coefficient satisfies a data distortion rate and a compression ratio of a preset condition according to a target compression ratio. By constructing different quantization tables for different data, a (Continued)

distortion rate is greatly reduced based on satisfying a compression ratio, and issues that the distortion rate and the compression ratio cannot be simultaneously satisfied in the prior art are alleviated.

17 Claims, 3 Drawing Sheets

(51) Int. Cl.
*H04N 19/119* (2014.01)
*H04N 19/126* (2014.01)
*H04N 19/625* (2014.01)
*H04N 19/85* (2014.01)
*H04N 19/91* (2014.01)
*G06T 3/40* (2006.01)

(52) U.S. Cl.
CPC ......... *H04N 19/126* (2014.11); *H04N 19/625* (2014.11); *H04N 19/85* (2014.11); *H04N 19/91* (2014.11)

(56) References Cited

U.S. PATENT DOCUMENTS

| | | | |
|---|---|---|---|
| 2004/0196903 A1* | 10/2004 | Kottke | H04N 19/147 375/240.03 |
| 2006/0013497 A1* | 1/2006 | Yang | H04N 19/93 382/245 |
| 2007/0009164 A1* | 1/2007 | Takahashi | H04N 19/60 382/239 |
| 2007/0047646 A1 | 3/2007 | Koh et al. | |
| 2008/0285866 A1 | 11/2008 | Ishikawa | |
| 2009/0083042 A1 | 3/2009 | Suwabe | |
| 2017/0150148 A1* | 5/2017 | Zhang | G06T 7/11 |

FOREIGN PATENT DOCUMENTS

| | | |
|---|---|---|
| CN | 101309414 A | 11/2008 |
| CN | 101432803 A | 5/2009 |
| CN | 102595138 A | 7/2012 |
| CN | 103108179 A | 5/2013 |
| CN | 104581158 A | 4/2015 |

* cited by examiner

DATA COMPRESSION DEVICE AND COMPRESSION METHOD CONFIGURED TO GRADUALLY ADJUST A QUANTIZATION STEP SIZE TO OBTAIN AN OPTIMAL TARGET QUANTIZATION STEP SIZE

FIELD OF INVENTION

The present disclosure relates to the field of data processing technologies, and more particularly to a data compression device and a compression method.

BACKGROUND OF INVENTION

In current displays, compensation algorithms are often used to compensate for uneven display performance of liquid crystal panels. As a resolution of the liquid crystal panel increases, a storage unit required to compensate data becomes larger and larger, the cost is also higher and higher, and compensation data needs to be compressed.

Existing compression processing of compensation data includes lossy compression and lossless compression. However, lossless compression usually has a low compression ratio and cannot achieve compression requirements. Lossy compression has a high compression ratio, but distortion is more serious after the data is compressed.

Therefore, the existing data compression method has issues that the distortion rate and the compression ratio cannot be simultaneously satisfied and needs to be improved.

SUMMARY OF INVENTION

An embodiment of the present invention provides a data compression apparatus and a compression method, which can alleviate issues that an existing data compression method cannot simultaneously satisfy a distortion rate and a compression ratio.

To solve the above issues, technical solutions provided by the present application are as follows:

An embodiment of the present application provides a data compression device, comprising: a pre-processing unit configured to pre-process data to be compressed; a quantization table processing unit configured to determine a target quantization table according to a target compression ratio, wherein a quantization coefficient in the target quantization table causes a data distortion rate and a compression ratio to satisfy a preset condition; a quantization unit configured to perform quantization and compression processing on pre-processed data by the target quantization table; and a post-processing unit configured to perform subsequent processing on quantized compressed data to obtain compressed data corresponding to the data to be compressed.

In an embodiment of the present application, the pre-processing unit comprises a data dividing subunit and a coefficient transform subunit, the data dividing subunit is configured to divide the data to be compressed according to requirements, the coefficient transform subunit is configured to perform coefficient transform processing on a divided data to be compressed.

In an embodiment of the present application, the coefficient transform subunit comprises a discrete cosine positive exchange converter configured to convert the divided data to be compressed into corresponding transform coefficients according to a discrete cosine positive transform formula.

In an embodiment of the present application, the quantization table processing unit comprises a quantization table selection subunit and a target quantization table construction subunit, the quantization table selection subunit is configured to select a corresponding quantization table according to a size of the target compression ratio, and the target quantization table construction subunit is configured to optimize the quantization table according to the preset condition, thereby obtaining the target quantization table.

In an embodiment of the present application, the preset condition is that after the data to be compressed is compressed, a data size thereof satisfies a size of a target output data, and a data loss is minimal.

In an embodiment of the present application, the target quantization table construction subunit is configured to quantize the corresponding transform coefficients by a quantization step size in the quantization table after the quantization table is selected, and obtained quantized coefficients are subjected to subsequent compression processing, and then a size of finally obtained compressed data and a size of the target output data are compared, if the compressed data is greater than or equal to the target output data, an optimization is terminated, and an original quantization step size is a target quantization step size, if the compressed data is less than the target output data, a quantization step value on a coefficient is decremented by 1, and the above quantization processing step, subsequent compression processing, and comparison steps are repeated until the obtained compressed data is greater than or equal to the target output data; if the quantization step size is 1, the compressed data is still less than the target output data, and the quantization step size when data loss amount and a ratio of the data to be compressed are the smallest is selected as the target quantization step size of the coefficient.

In an embodiment of the present application, the target quantization table is an optimized quantization table corresponding to a minimum value of the target compression ratio.

In an embodiment of the present application, the target quantization table is a quantization table obtained by weighted an average an optimized quantization table.

In an embodiment of the present application, the post-processing unit comprises an encoding processing subunit configured to encode data after a quantization compression processing.

In an embodiment of the present application, the encoding processing subunit comprises an entropy encoder configured to entropy encode a quantized compressed data.

An embodiment of the present application further provides a data compression method, comprising: preprocessing data to be compressed by a pre-processing unit; determining, by a quantization table processing unit, a target quantization table according to a target compression ratio, wherein a quantization coefficient in the target quantization table causes a data distortion rate and a compression ratio to satisfy a preset condition; performing quantization and compression processing on pre-processed data by the target quantization table by a quantization unit; and performing subsequent processing on quantized compressed data to obtain compressed data corresponding to the data to be compressed by a post-processing unit.

In an embodiment of the present application, the step of preprocessing the data to be compressed comprises: dividing the data to be compressed by a data dividing subunit; performing coefficient transform processing on a divided data to be compressed by a coefficient transform subunit.

In an embodiment of the present application, the step of performing coefficient transform processing on the divided data to be compressed comprises: converting the divided data to be compressed into corresponding transform coefficients according to a discrete cosine positive transform formula by a discrete cosine positive exchange converter.

In an embodiment of the present application, the step of determining the target quantization table according to the target compression ratio comprises: selecting a corresponding quantization table according to a size of the target compression ratio by a quantization table selection subunit; and optimizing the quantization table according to the preset condition, thereby obtaining the target quantization table by a target quantization table construction subunit.

In an embodiment of the present application, the step of selecting the corresponding quantization table according to the size of the target compression ratio comprises: determining the size of the target compression ratio according to a size of the data to be compressed and a size of a corresponding output data; and selecting a corresponding quantization table according to the size of the target compression ratio.

In an embodiment of the present application, the step of optimizing the quantization table according to the preset condition comprises: quantizing the corresponding transform coefficients by a quantization step size in the quantization table, performing subsequent compression processing on obtained quantized coefficients, and then comparing a size of finally obtained compressed data and a size of the target output data; if the compressed data is greater than or equal to the target output data, an optimization is terminated, wherein an original quantization step size is a target quantization step size; if the compressed data is less than the target output data, a quantization step value on a coefficient is decremented by 1, and the above quantization processing step, subsequent compression processing, and comparison steps are repeated until the obtained compressed data is greater than or equal to the target output data; if the quantization step size is 1, the compressed data is still less than the target output data, wherein the quantization step size when data loss amount and a ratio of the data to be compressed are the smallest is selected as the target quantization step size of the coefficient.

In an embodiment of the present application, optimizing the quantization table according to the preset condition comprises optimizing one by one on coefficients in a quantization table.

In an embodiment of the present application, optimizing the quantization table according to the preset condition comprises performing synchronization optimization on all coefficients in a quantization table.

In an embodiment of the present application, the step of obtaining the target quantization table comprises weighting an average of an optimized quantization table to obtain the target quantization table.

In an embodiment of the present application, the step of performing subsequent processing on quantized compressed data comprises: performing entropy encode on a quantized compressed data.

Beneficial effects of the present application are that: a data compression device and a compression method of embodiments of the present application are provided. The data compression device includes a quantization table processing unit and a quantization unit. The quantization table processing unit determines a target quantization table in which a quantization coefficient satisfies a data distortion rate and a compression ratio of a preset condition according to a target compression ratio. The quantization unit is configured to perform quantization and compression processing on the preprocessed data using the target quantization table. By constructing different quantization tables for different data, a distortion rate is greatly reduced based on satisfying a compression ratio, and issues that the distortion rate and the compression ratio cannot be simultaneously satisfied in the prior art are alleviated.

DESCRIPTION OF DRAWINGS

In order to more clearly illustrate the embodiments or the technical solutions in the prior art, the drawings to be used in the embodiments or the prior art description will be briefly described below. Obviously, the drawings in the following description are only some embodiments of the invention. Other drawings from these figures may also be obtained from those of ordinary skill in the art without undue creative effort.

DETAILED DESCRIPTION OF PREFERRED EMBODIMENTS

The following description of the various embodiments is provided to illustrate the specific embodiments of the present invention. The directional terms mentioned in the present application, such as up, down, front, back, left, right, inside, outside, side, etc., are only directions referring to the additional drawings. Therefore, the directional terminology used is for the purpose of illustration and understanding and is not intended to be limiting. In the figures, structurally similar elements are denoted by the same reference numerals.

Aiming at issues of low compression rate and severe distortion existing in existing compression methods of compensation data, the present application provides a data compression device and a compression method to alleviate the issues.

Figure 1:
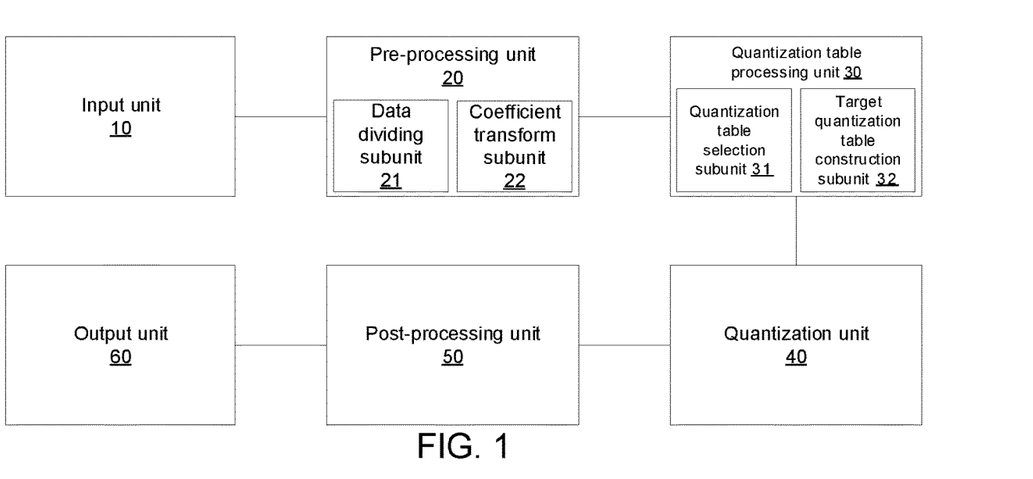
FIG. 1 is a schematic diagram of a data compression device according to an embodiment of the present application.

In an embodiment, as shown in FIG. 1, a data compression device provided by the embodiment of the present application includes:

An input unit 10 configured to input original data to be compressed.

A pre-processing unit 20 configured to pre-process data to be compressed; wherein the pre-processing unit comprises a data dividing subunit 21 and a coefficient transform subunit 22, the data dividing subunit 21 is configured to divide the data to be compressed according to requirements, the coefficient transform subunit 22 is configured to perform coefficient transform processing on a divided data to be compressed; the coefficient transform subunit 22 comprises a discrete cosine positive exchange converter configured to convert the divided data to be compressed into corresponding transform coefficients according to a discrete cosine positive transform formula.

A quantization table processing unit 30 configured to determine a target quantization table according to a target compression ratio, wherein a quantization coefficient in the target quantization table causes a data distortion rate and a compression ratio to satisfy a preset condition; wherein the quantization table processing unit 30 comprises a quantization table selection subunit 31 and a target quantization table construction subunit 32, the quantization table selection subunit 31 is configured to select a corresponding quantization table according to a size of the target compression ratio, and the target quantization table construction subunit 32 is configured to optimize the quantization table according to the preset condition, thereby obtaining the target quantization table.

A quantization unit 40 configured to perform quantization and compression processing on pre-processed data by the target quantization table.

A post-processing unit 50 configured to perform subsequent processing on quantized compressed data to obtain compressed data corresponding to the data to be compressed.

An output unit 60 configured to output compressed data.

An embodiment of the present application provides a data compression device. The data compression device includes a quantization table processing unit and a quantization unit. The quantization table processing unit determines a target quantization table in which a quantization coefficient satisfies a data distortion rate and a compression ratio of a preset condition according to a target compression ratio. The quantization unit is configured to perform quantization and compression processing on the preprocessed data using the target quantization table. By constructing different quantization tables for different data, a distortion rate is greatly reduced based on satisfying a compression ratio, and issues that the distortion rate and the compression ratio cannot be simultaneously satisfied in the prior art are alleviated.

Due to huge amount of data of multimedia information, it requires a large amount of storage space and may exceed a transmission rate of a line. In order to reduce the storage space and transmission bandwidth and preform real-time and high-quality multimedia communication, multimedia data must be compressed. Multimedia data is varied, including video, audio, images, and more. Ae data compression device and a compression method provided by embodiments of the present application are described in detail below by taking a frame image as an example.

In one embodiment, the data to be compressed input by the input unit is image information on an acquired display panel. The image information of the display panel may be a grayscale value of a monochrome image or may be a luminance component of a color image or a color difference component signal or a color difference component signal.

In one embodiment, the input unit first inputs the data to be compressed into the pre-processing unit 20. In the data dividing subunit 21 of the pre-processing unit 20, the data dividing subunit 21 divides the image to be compressed into a series of 8*8 image sampling regions. Each 8*8 two-dimensional image sample data block is actually a 64-point discrete signal. This signal is a function of spatial two-dimensional parameters x and y. Each 8*8 two-dimensional image sample data block is represented by 64 functions for x and y, respectively, to obtain a block data function.

In an embodiment, further, when the image is subjected to blocking processing, each of the obtained 8*8 two-dimensional image sample data blocks is equal in size.

In an embodiment, the data dividing subunit 21 transfers the data to be compressed into the coefficient transform subunit 22 of the pre-processing unit 20 after dividing the data to be compressed. The coefficient transform subunit 22 further converts the data to be compressed into transform coefficients. The coefficient transform subunit 22 includes a discrete cosine positive exchange converter. The data to be compressed transmitted to the coefficient transform subunit 22 is a block data function of the image to be compressed.

The discrete cosine positive exchange converter converts the block data function into corresponding transform coefficients according to the discrete cosine positive transform formula therein.

Discrete cosine transform processing is a transform process for 8*8 sampled data blocks. It can be a pair of images from left to right, top to bottom, piece by piece (8*8/block) transform compression, or it can also take 8*8 sample block compression for multiple pictures in turn.

Since the block data function of an 8*8 image is 64 orthogonal base signals. Each orthogonal signal corresponds to one of 64 two-dimensional spatial frequencies. These spatial frequencies are composed of the spectrum of the input signal. The output of the discrete cosine positive transform is the amplitude of the 64 base signals. That is, the transform coefficient. Each coefficient value is uniquely determined by the 64-point input signal, that is, the transform coefficient of the discrete cosine transform. On the frequency domain plane, the transform coefficients are functions of the two-dimensional frequency domain variables u and v. The coefficient corresponding to u=0, v=0 is called the direct current component, that is, the direct current transform coefficient. The remaining 63 coefficients are called AC components, that is, AC transform coefficients. The grayscale or color difference signals between pixels in a picture change slowly. The correlation between pixels in the 8*8 sub-block is very strong. After the discrete cosine positive transform process, a large numerical coefficient is concentrated in the low frequency range of the spatial frequency. This makes it possible to compress data. The high frequency AC coefficients far from the DC coefficient are mostly zero or tend to zero.

In one embodiment, quantization table processing unit 30 is operative to determine a target quantization table based on the target compression ratio. The quantized coefficients in the target quantization table cause the data distortion rate and the compression ratio to satisfy the preset condition. The quantization table selection subunit 31 in the quantization table processing unit 30 is configured to select a corresponding quantization table according to the size of the target compression ratio. The size of the target compression ratio is determined according to the size of the data to be compressed and the size of the corresponding output data. That is, the ratio of the size of the data to be compressed to the size of the corresponding output data. According to the size range of the output data, the target compression ratio is fixed within a corresponding determined value range. Then, the corresponding quantization table is selected according to the range of the target compression ratio. The corresponding quantization table may have only one corresponding one sheet or multiple sheets.

Further, for different types of data to be compressed, the requirements and sizes of the output data are different. The size of the output data corresponding to the data type to be compressed should be determined first according to the type of data to be compressed. Further, the size of the target compression ratio is determined according to the size of the data to be compressed and the size of the corresponding output data. In the embodiment of the present application, image data is taken as an example.

In one embodiment, the quantization table selection subunit 31 supplies the selected quantization table to the quantization table construction subunit 32. The target quantization table construction subunit 32 is configured to optimize the quantization table according to a preset condition, thereby obtaining a target quantization table. The preset condition is that after the data to be compressed is quantized and compressed, the output condition is satisfied (i.e., the compression ratio of the output data satisfies the target compression ratio range, or the output data size satisfies the output size requirement) and the data loss is minimal (i.e., That is, the ratio of the size of the loss data to the size of the data to be compressed is the smallest).

Since the quantization step size is the value of each coefficient in the quantization table. The quantization table coefficients vary with the position of the transform coefficients. The size of the quantization table is also 8*8, which corresponds one-to-one with 64 transform coefficients. Each coefficient value in the quantization table is an arbitrary integer between 1 and 255, the value of which specifies the quantizer step size of the corresponding position transform coefficient.

The target quantization table construction subunit 32 is configured to quantize the corresponding transform coefficients by a quantization step size in the quantization table after the quantization table is selected, and obtained quantized coefficients are subjected to subsequent compression processing, and then a size of finally obtained compressed data and a size of the target output data are compared, if the compressed data is greater than or equal to the target output data, an optimization is terminated, and an original quantization step size is a target quantization step size, if the compressed data is less than the target output data, a quantization step value on a coefficient is decremented by 1, and the above quantization processing step, subsequent compression processing, and comparison steps are repeated until the obtained compressed data is greater than or equal to the target output data; if the quantization step size is 1, the compressed data is still less than the target output data, and the quantization step size when data loss amount and a ratio of the data to be compressed are the smallest is selected as the target quantization step size of the coefficient.

In the embodiment, the quantization table construction subunit 32 optimizes the quantization table to optimize all quantization tables satisfying the target compression ratio, including optimization of the quantization step size for each coefficient in the quantization table that satisfies the target compression ratio. That is, for the quantization step size of each coefficient in the selected quantization table, the corresponding compression data is subjected to analog compression processing, and the quantization step size is gradually adjusted to obtain an optimal target quantization step size that satisfies the preset condition.

The quantization table construction subunit 32 optimizes the quantization table, which may be an optimization of one by one for each coefficient in the quantization table, or a synchronization optimization of all coefficients in the quantization table.

The target quantization table finally obtained may be an optimized quantization table corresponding to the minimum value of the target compression ratio or may be a quantization table obtained by optimizing the weighted average of the quantization tables satisfying the target compression ratio. Each quantized coefficient in the target quantization table is an optimized target quantized coefficient.

In one embodiment, the quantization unit 40 is configured to perform quantization and compression processing on the pre-processed data using the target quantization table. In order to achieve the purpose of compressing data, the transform coefficients processed by the discrete cosine positive exchange need to be quantized. Quantization processing is a one-to-one mapping. In addition, it is also the source of information loss caused by data compression processing. The definition of quantization is to divide the 64 transform coefficients by the corresponding quantization step size and round off to obtain the corresponding quantized coefficients.

After the 64 transform coefficients are quantized, coordinates u=0, v=0, and their corresponding quantized coefficients are DC components (that is DC coefficient). The remaining 63 quantized coefficients are the AC components (that is AC coefficients). The DC coefficient is the average of 64 image samples and contains the main portion of the overall image energy.

The cosine functions of different frequencies have different effects on vision. The quantization process selects the size of the coefficient value in the quantization table according to the visual threshold of different frequencies under the premise of a certain subjective fidelity image quality. The transform coefficient is divided by the quantization step size of the corresponding position in the quantization table, the amplitude thereof is decreased, the dynamic range is narrowed, and the number of zero values of the high frequency coefficient is increased.

In an embodiment, the post-processing unit 50 is configured to perform subsequent processing on the quantized compressed data to obtain compressed data corresponding to the data to be compressed. The post-processing unit 50 includes an encoding processing subunit. There is an entropy encoder in the encoding processing subunit. The entropy encoder is configured to perform entropy encoding processing on the data after the quantization compression processing. Entropy coding is a type of lossless coding that refers to the nature of compressed data.

In order to further achieve the purpose of compressing data, it is necessary to perform entropy coding based on statistical characteristics on the quantized quantization coefficients. Before entropy coding, 63 AC coefficients need to be arranged in a zigzag pattern. In turn, a two-dimensional 8*8 matrix is transformed into a one-dimensional 1*64 vector. The lower frequency vector is placed at the top of the vector. The AC coefficients are then encoded using Run Length Encoding (RLE). Because of the strong correlation between adjacent 8×8 blocks, the DC coefficient values of adjacent blocks are very close. The difference between the DC coefficients of adjacent image blocks is encoded using differential pulse code modulation (DPCM), which can be used with fewer bits.

The entropy encoder is used for further compression coding of the DPCM encoded DC coefficient and the RLE encoded AC coefficient. When the data is processed by the entropy coder, a relatively short code is generally assigned to the coefficient with a higher frequency, and a longer code is assigned to the coefficient with a lower frequency.

In one embodiment, the output unit 60 is operative to output compressed data. The output unit 60 finally composes the compressed data completed by the encoding process into data of one frame and one frame, that is, a data stream, and outputs it.

Figure 2:
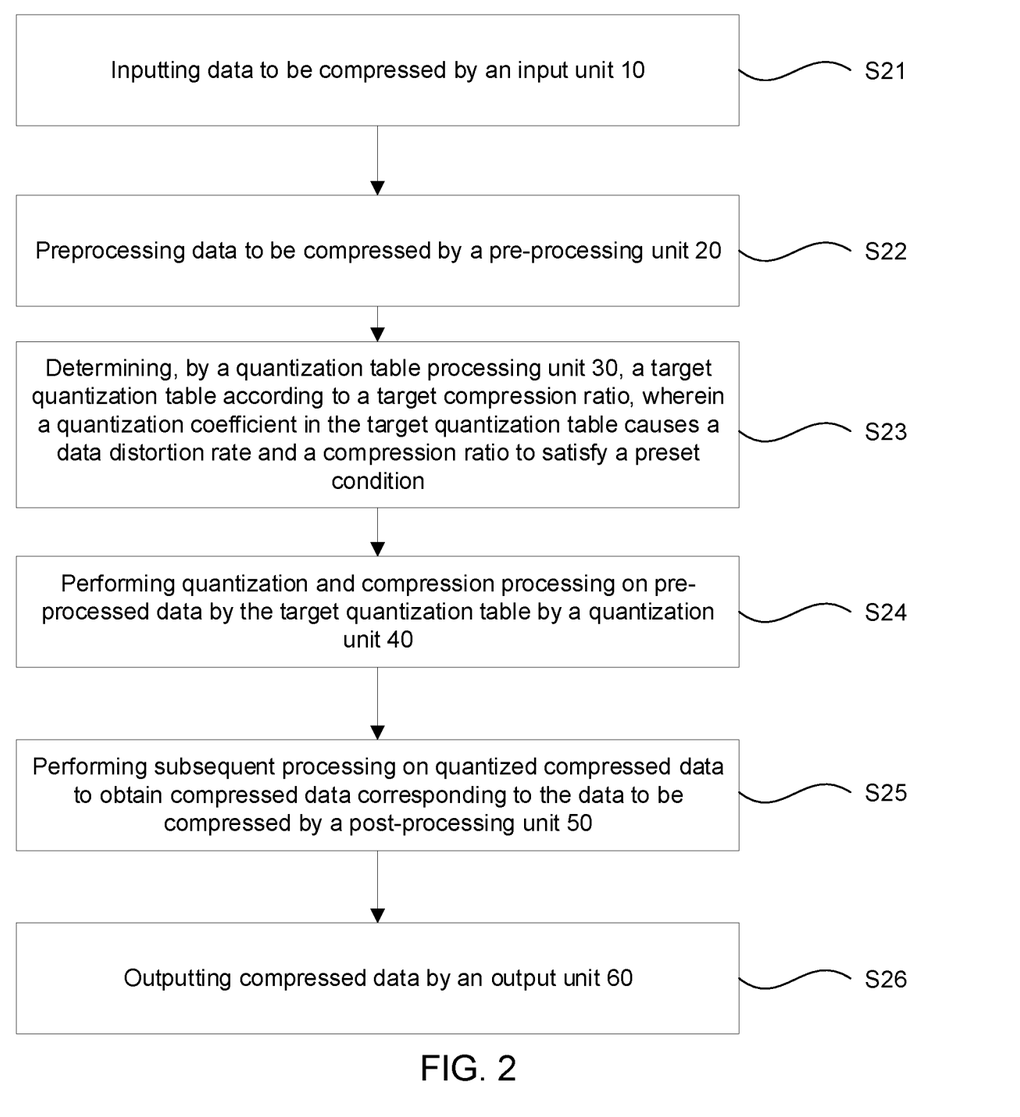
FIG. 2 is a schematic diagram of a data compression process according to an embodiment of the present application.

In addition, in an embodiment, as shown in FIG. 2, a data compression method provided by an embodiment of the present application includes:

Step S21, inputting data to be compressed by an input unit 10.

Step S22, preprocessing data to be compressed by a pre-processing unit 20.

Step S23, determining, by a quantization table processing unit 30, a target quantization table according to a target compression ratio, wherein a quantization coefficient in the target quantization table causes a data distortion rate and a compression ratio to satisfy a preset condition.

Step S24, performing quantization and compression processing on pre-processed data by the target quantization table by a quantization unit 40.

Step S25, performing subsequent processing on quantized compressed data to obtain compressed data corresponding to the data to be compressed by a post-processing unit 50.

Step S26, outputting compressed data by an output unit 60.

An embodiment of the present application provides a data compression method. The data compression method includes that: a quantization table processing unit determines a target quantization table in which a quantization coefficient satisfies a data distortion rate and a compression ratio of a preset condition according to a target compression ratio. The quantization unit is configured to perform quantization and compression processing on the preprocessed data using the target quantization table. By constructing different quantization tables for different data, a distortion rate is greatly reduced based on satisfying a compression ratio, and issues that the distortion rate and the compression ratio cannot be simultaneously satisfied in the prior art are alleviated.

In one embodiment, the step of preprocessing the data to be compressed comprises:

Dividing the data to be compressed by a data dividing subunit 21, wherein the data dividing subunit 21 divides the image to be compressed into a series of 8*8 image sampling regions. Each 8*8 two-dimensional image sample data block is actually a 64-point discrete signal, this signal is a function of spatial two-dimensional parameters x and y, each 8*8 two-dimensional image sample data block is represented by 64 functions for x and y, respectively, to obtain a block data function.

Performing coefficient transform processing on a divided data to be compressed by a coefficient transform subunit 22, wherein the coefficient transform subunit 22 includes a discrete cosine positive exchange converter, the discrete cosine positive exchange converter converts the block data function into corresponding transform coefficients according to the discrete cosine positive transform formula therein, discrete cosine transform processing is a transform process for 8*8 sampled data blocks, it can be a pair of images from left to right, top to bottom, piece by piece (8*8/block) transform compression, or it can also take 8*8 sample block compression for multiple pictures in turn.

In one embodiment, the step of determining the target quantization table according to the target compression ratio comprises:

Selecting a corresponding quantization table according to a size of the target compression ratio by a quantization table selection subunit 31, wherein the size of the output data corresponding to the data type to be compressed is determined according to the type of the data to be compressed, the size of the target compression ratio is determined according to the size of the data to be compressed and the size of the corresponding output data, then, the corresponding quantization table is selected according to the range of the target compression ratio, the corresponding quantization table may have only one corresponding one sheet or multiple sheets.

Optimizing the quantization table according to the preset condition, thereby obtaining the target quantization table by a target quantization table construction subunit 32, wherein the preset condition is that after the data to be compressed is quantized and compressed, the output condition is satisfied (i.e., the compression ratio of the output data satisfies the target compression ratio range, or the output data size satisfies the output size requirement) and the data loss is minimal (i.e., That is, the ratio of the size of the loss data to the size of the data to be compressed is the smallest).

Figure 3:
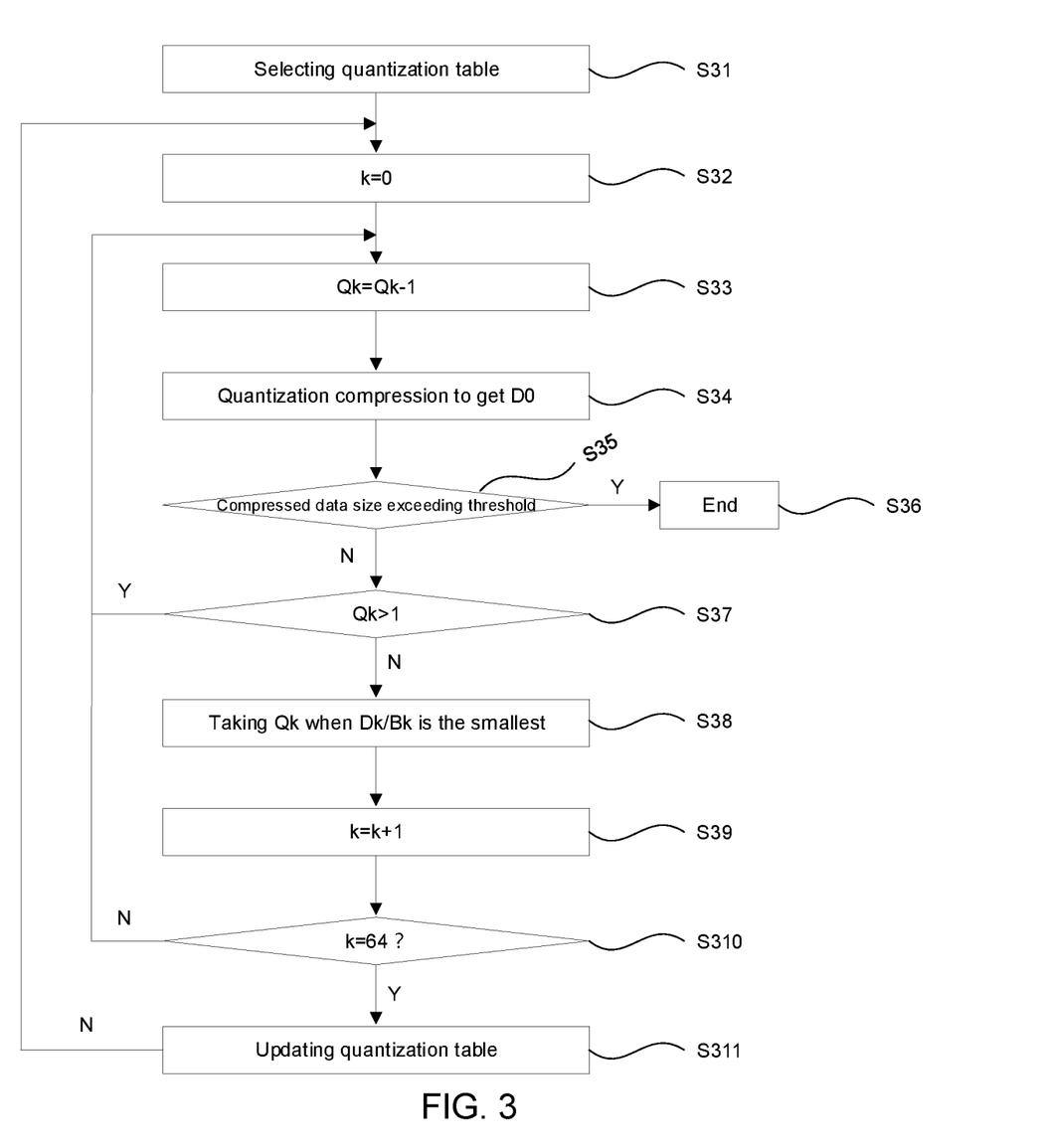
FIG. 3 is a schematic diagram of a process of constructing a quantization table according to an embodiment of the present application.

In one embodiment, as shown in FIG. 3, the method includes quantizing the corresponding transform coefficients by a quantization step size QK in the quantization table, performing subsequent compression processing on obtained quantized coefficients, and then comparing a size of finally obtained compressed data and a size of the target output data; if the compressed data is greater than or equal to the target output data, an optimization is terminated, wherein an original quantization step size is a target quantization step size; if the compressed data is less than the target output data, a quantization step value on a coefficient is decremented by 1, and the above quantization processing step, subsequent compression processing, and comparison steps are repeated until the obtained compressed data is greater than or equal to the target output data; if the quantization step size is 1, the compressed data is still less than the target output data, wherein the quantization step size when data loss amount DK and a ratio of the data to be compressed BK are the smallest is selected as the target quantization step size of the coefficient. Then, the next coefficient is optimized by the above implementation steps until the quantization step size of all the coefficients in the entire quantization table is optimized to the target quantization step size, and then the next quantization table is replaced for optimization.

In the embodiment, optimizing the quantization table may comprise optimizing one by one on coefficients in a quantization table or performing synchronization optimization on all coefficients in a quantization table.

The target quantization table finally obtained may be an optimized quantization table corresponding to the minimum value of the target compression ratio or may be a quantization table obtained by optimizing the weighted average of the quantization tables satisfying the target compression ratio.

In one embodiment, the step of preprocessing the data to be compressed comprises that:

The 64 transform coefficients are divided by the corresponding quantization step size and rounded to obtain the corresponding quantized coefficients. Its quantized coefficients include a DC coefficient and 63 AC coefficients.

In one embodiment, the step of performing subsequent processing on quantized compressed data comprises:

Performing "z" shaped arrangement for 63 AC coefficients and then converting a two-dimensional 8*8 matrix into a one-dimensional 1*64 vector.

Encoding the AC coefficients using run length coding (RLE).

Encoding differential values of DC coefficients of adjacent image blocks using differential pulse code modulation (DPCM).

Further compressing the DPCM encoded DC coefficient and the RLE encoded AC coefficient using an entropy encoder.

According to the above embodiment, it can be known that:

A data compression device and a compression method of embodiments of the present application are provided. The data compression device includes a quantization table processing unit and a quantization unit. The quantization table processing unit determines a target quantization table in which a quantization coefficient satisfies a data distortion rate and a compression ratio of a preset condition according to a target compression ratio. The quantization unit is configured to perform quantization and compression processing on the preprocessed data using the target quantization table. By constructing different quantization tables for different data, a distortion rate is greatly reduced based on satisfying a compression ratio, and issues that the distortion rate and the compression ratio cannot be simultaneously satisfied in the prior art are alleviated.

In summary, although the present application has been disclosed above in the preferred embodiments, the above preferred embodiments are not intended to limit the present application. Various modifications and refinements can be made by those skilled in the art without departing from the spirit and scope of the present application. The protection scope of the present application is therefore defined by the scope of the claims.

What is claimed is:

1. A data compression device, comprising:
a pre-processing unit configured to pre-process data to be compressed;
a quantization table processing unit configured to determine a target quantization table according to a target compression ratio, wherein a quantization coefficient in the target quantization table causes a data distortion rate and a compression ratio to satisfy a preset condition;
a quantization unit configured to perform quantization and compression processing on pre-processed data by the target quantization table; and
a post-processing unit configured to perform subsequent processing on quantized compressed data to obtain compressed data corresponding to the data to be compressed;
wherein performing subsequent processing on the quantized compressed data comprises:
performing a z shaped arrangement for 63 AC coefficients; and
encoding the 63 AC coefficients using a run length coding (RLE);
wherein the quantization table processing unit comprises a quantization table construction subunit, the quantization table construction subunit optimizes the target quantization table including optimization of a quantization step size for each coefficient in the target quantization table that satisfies the target compression ratio; for the quantization step size of each coefficient in the target quantization table, a corresponding compression data is subjected to analog compression processing, and the quantization step size is gradually adjusted to obtain an optimal target quantization step size that satisfies the preset condition; the quantization table construction subunit optimizes the target quantization table including a synchronization optimization of all coefficients in the target quantization table; and each quantized coefficient in the target quantization table is an optimized target quantized coefficient.

2. The data compression device according to claim 1, wherein the pre-processing unit comprises a data dividing subunit and a coefficient transform subunit, the data dividing subunit is configured to divide the data to be compressed according to requirements, the coefficient transform subunit is configured to perform coefficient transform processing on a divided data to be compressed.

3. The data compression device according to claim 2, wherein the coefficient transform subunit comprises a discrete cosine positive exchange converter configured to convert the divided data to be compressed into corresponding transform coefficients according to a discrete cosine positive transform formula.

4. The data compression device according to claim 1, wherein the quantization table processing unit comprises a quantization table selection subunit and a target quantization table construction subunit, the quantization table selection subunit is configured to select a corresponding quantization table according to a size of the target compression ratio, and the target quantization table construction subunit is configured to optimize the quantization table according to the preset condition, thereby obtaining the target quantization table.

5. The data compression device according to claim 4, wherein the preset condition is that after the data to be compressed is compressed, a data size thereof satisfies a size of a target output data, and a data loss is minimal.

6. The data compression device according to claim 5, wherein the target quantization table construction subunit is configured to quantize the corresponding transform coefficients by a quantization step size in the quantization table after the quantization table is selected, and obtained quantized coefficients are subjected to subsequent compression processing, and then a size of finally obtained compressed data and a size of the target output data are compared, if the compressed data is greater than or equal to the target output data, an optimization is terminated, and an original quantization step size is a target quantization step size, if the compressed data is less than the target output data, a quantization step value on a coefficient is decremented by 1, and the above quantization processing step, subsequent compression processing, and comparison steps are repeated until the obtained compressed data is greater than or equal to the target output data; if the quantization step size is 1, the compressed data is still less than the target output data, and the quantization step size when data loss amount and a ratio of the data to be compressed are the smallest is selected as the target quantization step size of the coefficient.

7. The data compression device according to claim 4, wherein the target quantization table is an optimized quantization table corresponding to a minimum value of the target compression ratio.

8. The data compression device according to claim 1, wherein the post-processing unit comprises an encoding processing subunit configured to encode data after a quantization compression processing.

9. The data compression device according to claim 8, wherein the encoding processing subunit comprises the entropy encoder configured to entropy encode a quantized compressed data.

10. A data compression method, comprising:
preprocessing data to be compressed by a pre-processing unit;
determining, by a quantization table processing unit, a target quantization table according to a target compression ratio, wherein a quantization coefficient in the target quantization table causes a data distortion rate and a compression ratio to satisfy a preset condition;
performing quantization and compression processing on pre-processed data by the target quantization table by a quantization unit; and
performing subsequent processing on quantized compressed data to obtain compressed data corresponding to the data to be compressed by a post-processing unit;
wherein performing subsequent processing on the quantized compressed data comprises:
performing a z shaped arrangement for 63 AC coefficients; and
encoding the 63 AC coefficients using a run length coding (RLE);

wherein the quantization table processing unit comprises a quantization table construction subunit, the quantization table construction subunit optimizes the target quantization table including optimization of a quantization step size for each coefficient in the target quantization table that satisfies the target compression ratio; for the quantization step size of each coefficient in the target quantization table, a corresponding compression data is subjected to analog compression processing, and the quantization step size is gradually adjusted to obtain an optimal target quantization step size that satisfies the preset condition; the quantization table construction subunit optimizes the target quantization table including a synchronization optimization of all coefficients in the target quantization table; and each quantized coefficient in the target quantization table is an optimized target quantized coefficient.

11. The data compression method according to claim 10, wherein the step of preprocessing the data to be compressed comprises:
dividing the data to be compressed by a data dividing subunit;
performing coefficient transform processing on a divided data to be compressed by a coefficient transform subunit.

12. The data compression method according to claim 11, wherein the step of performing coefficient transform processing on the divided data to be compressed comprises:
converting the divided data to be compressed into corresponding transform coefficients according to a discrete cosine positive transform formula by a discrete cosine positive exchange converter.

13. The data compression method according to claim 10, wherein the step of determining the target quantization table according to the target compression ratio comprises:
selecting a corresponding quantization table according to a size of the target compression ratio by a quantization table selection subunit; and
optimizing the quantization table according to the preset condition, thereby obtaining the target quantization table by a target quantization table construction subunit.

14. The data compression method according to claim 13, wherein the step of selecting the corresponding quantization table according to the size of the target compression ratio comprises:
determining the size of the target compression ratio according to a size of the data to be compressed and a size of a corresponding output data; and
selecting a corresponding quantization table according to the size of the target compression ratio.

15. The data compression method according to claim 13, wherein the step of optimizing the quantization table according to the preset condition comprises:
quantizing the corresponding transform coefficients by a quantization step size in the quantization table, performing subsequent compression processing on obtained quantized coefficients, and then comparing a size of finally obtained compressed data and a size of the target output data;
if the compressed data is greater than or equal to the target output data, an optimization is terminated, wherein an original quantization step size is a target quantization step size;
if the compressed data is less than the target output data, a quantization step value on a coefficient is decremented by 1, and the above quantization processing step, subsequent compression processing, and comparison steps are repeated until the obtained compressed data is greater than or equal to the target output data;
if the quantization step size is 1, the compressed data is still less than the target output data, wherein the quantization step size when data loss amount and a ratio of the data to be compressed are the smallest is selected as the target quantization step size of the coefficient.

16. The data compression method according to claim 15, wherein optimizing the quantization table according to the preset condition comprises optimizing one by one on coefficients in a quantization table.

17. The data compression method according to claim 10, wherein the step of performing subsequent processing on quantized compressed data comprises:
performing entropy encode on a quantized compressed data.

* * * * *